United States Patent

[11] 3,565,040

| [72] | Inventor | Harold J. Pohl |
| | | Washington, Mo. |
| [21] | Appl. No. | 713,600 |
| [22] | Filed | Mar. 18, 1968 |
| [45] | Patented | Feb. 23, 1971 |
| [73] | Assignee | Kellwood Company |
| | | St. Louis, Mo. |

[54] PET PAD
4 Claims, 3 Drawing Figs.

[52] U.S. Cl. ................................................. 119/1, 119/19
[51] Int. Cl. .................................................. A01k 1/00
[50] Field of Search ........................................ 119/1, 15, 19; 5/343, 344; 297/452, 454, 458, 17

[56] References Cited
UNITED STATES PATENTS

| 1,879,473 | 9/1932 | Pitts | 119/19 |
| 1,887,108 | 11/1932 | Steese | 119/19 |
| 2,775,222 | 12/1956 | Kruck | 119/1 |
| 2,803,291 | 8/1957 | Meyer | 297/457 |
| 2,854,948 | 10/1958 | Drayson | 119/1 |

*Primary Examiner*—Hugh R. Chamblee
*Attorneys*—Frank H. Marks and Nathan N. Kraus ABSTRACT: A bed for a small four-legged pet, comprising an elongated fabric base portion adapted to be disposed on a flat surface, a flexible fabric secured to an end of the base and extending partly thereover, and a rigid frame attached to the sides of the base and extending upwardly and rearwardly therefrom and having a cross piece attached to the free end of the flexible member to support the latter, so as to provide a bedding area on the flexible member and also on the base. The frame is preferably of telescopic tubing to permit convenient packing for mail-order shipment.

PATENTED FEB23 1971 3,565,040

INVENTOR
Harold J. Pohl
Frank H. Marko
Nathan N. Kraus, Att'ys

PET PAD

My invention relates to pads or beds for small animal pets such as cats and dogs.

Small animals such as dogs and cats like to sleep or rest on a bed of soft, yieldable material, which in nature may be a bed of leaves or other natural material. Also, especially in cool weather, they like to be at least partially covered by or to burrow into the bedding material, to provide contact or cover for the head.

THE PRIOR ART

To the best of my knowledge, devices previously known and used as bedding for small four-legged pets have been essentially in the form of baskets, trays or pallets containing a soft fabric upon which the animal's body may rest.

OUTLINE OF THE INVENTION

An object of my invention is to provide an article of the type referred to which makes available a number of positions for sleeping or resting, which positions may be used simultaneously by two different pets. Alternatively, a single animal may select any one of the available positions, said positions providing facilities differing in character for sleeping or resting.

Still another object is to provide such an article having a collapsible supporting frame in combination with flexible and resilient elements for direct support of the animal's body.

Another object is to provide an article of the class referred to which is simple, lightweight and inexpensive in construction and capable of packing in a small package for convenient mail-order shipment.

Various other objects and advantages will doubtless suggest themselves to those skilled in the art as the description proceeds.

BRIEF DESCRIPTION OF DRAWINGS

Referring now to the drawings forming a part of this specification and illustrating a preferred embodiment of my invention.

The numeral 10 indicates in general a pallet or bed for a small animal embodying my invention, comprising an elongated fabric member in generally rectangular form, having two major parts 12a and 12b. This member may be formed of any suitable soft fabric acceptable to the animal which is to use the article, such as flannelette or the like, formed of natural or synthetic fiber in whole or in part, and may be woven, knitted, etc.

Figure 1:
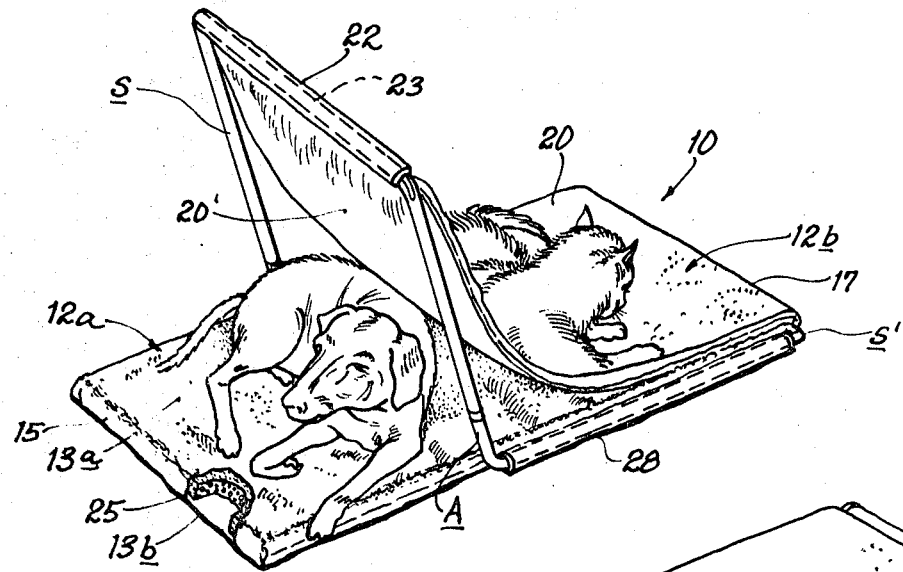
FIG. 1 is a perspective view of a pet bed illustrative of my invention, in operative condition.

The base portion 12a is an elongated envelope of fabric of the character referred to, having a top sheet portion 13a terminating as at 14 (FIG. 2) and may be folded over as at 15 to provide a bottom layer 13b (FIG. 1). The latter may be folded back at the end opposite end 15, as at 17, to provide a top sheet member 20. It will be obvious that in lieu of an integral folded fabric, separate sheets stitched together may be used for elements 13a, 13b and 20.

Said member 20 is secured as by stitching to a tubular envelope 22 encompassing crossbar 23 of a U-shaped support S. Said support S may be of any suitable tenuous material, preferably of aluminum or other lightweight material and conveniently of small-gauge tubing.

Figure 2:
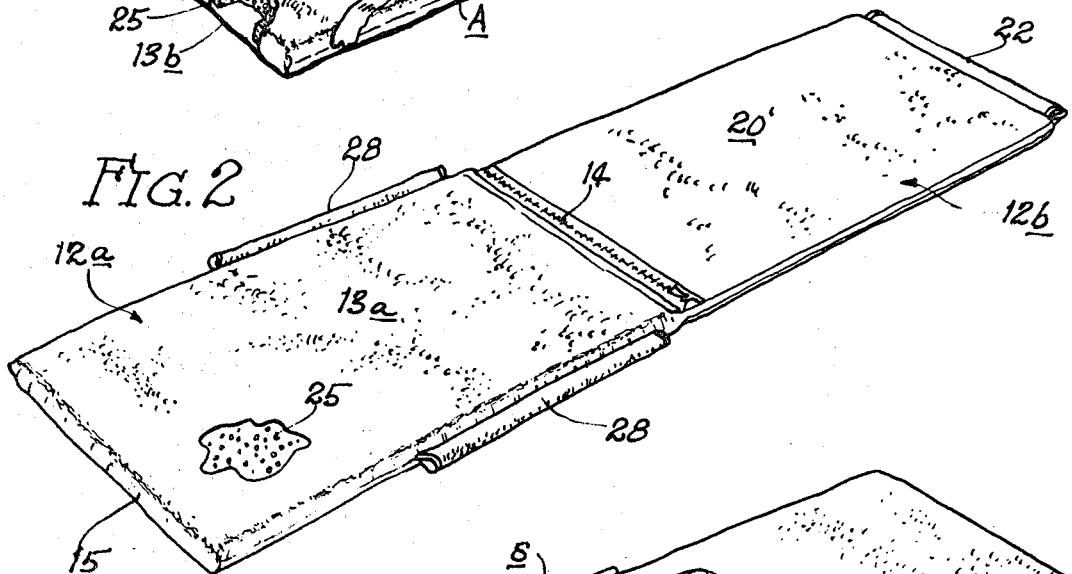
FIG. 2 is a perspective view of the same in extended, collapsed condition, without the hardware, ready to be set up for use or in the course of packing for shipment.

Another sheet 20' also stitched to envelope 22 may underlie sheet 20, said sheet 20' terminating along line 14 (FIG. 2). However, fabric portion 12b may if desired, be a single sheet rather than a double sheet 20 and 20', as shown.

Disposed within the envelope formed by fabric sheet 13a—13b is a rectangular resilient pad 25 formed of suitable resilient material such as a foam of natural or synthetic rubber, which might be polyurethane or the like. This pad 25 may be inserted within the aforesaid envelope through the opening thereof provided along the line 14, and need be only of sufficient thickness to provide a comfortable body support, say, 1 or 2 inches.

Although not required, the abutting edges along line 14 (FIG. 2) of fabric sheets 13a and 20' may be detachably secured together by any suitable fastening means such as a slide fastener, snappers, etc.

Fabric sleeves 28, 28 stitched along the side edges of envelope 12a (FIG. 2). Received in one end of said sleeves 28, 28 are the legs of a U-shaped member S', the crossbar of which member is disposed inside the fold between members 12a and 12b.

Extending into the opposite end of sleeves 28, 28 is an arm of angle members A, A formed of tubing or rod stock of such gauge as to fit snugly within the ends of U-members S, S', said angle members being bent at a suitable obtuse angle to permit the upper fabric member 12b to lie at an angle convenient for a reclining animal, such as the position taken by the fabric of a deck or lawn chair or the like. (FIG. 1)

Thus, in combination, U-members S and S' and angle members A, A form a rigid unitary supporting frame which is maintained in erect position, as seen in FIG. 1, by the weight of the fabric of member 12b, which stability is enhanced by the weight of an animal lying on member 12b.

In its erect position (FIG. 1) it will be seen that my improved bed will accommodate an animal in a choice of one of several positions, or may accommodate several animals. Thus, an animal may lie on top of member 12b, with a portion of sheet 20 under his body and the rising portion engaging his head, it being well known that an animal at rest likes to have its head in contact with soft material.

Fabric member 12a likewise provides a suitable animal support. Here, as on member 12b the animal has a choice of either lying with its head uncovered by any fabric, as might be desirable in warm weather, or may, as in cool weather, lie with its head or any desired portion of his body partially or wholly covered by the rising part of member 12b.

Thus, it will be seen that my improved bed is highly flexible in use, permitting an animal numerous choices of position and protection, according to its desires and according to the exigencies of the weather.

Figure 3:
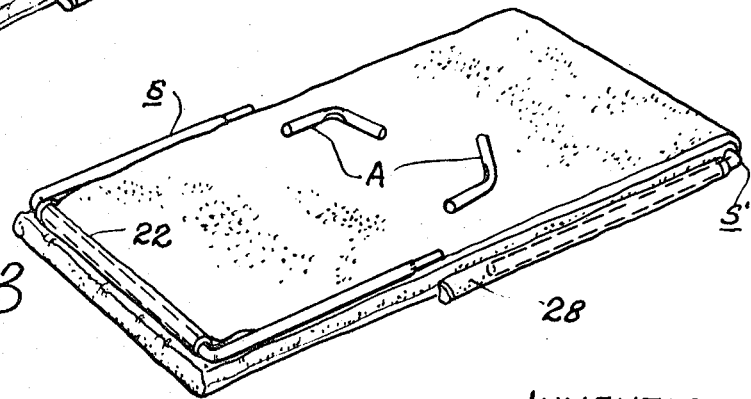
FIG. 3 is a perspective view of the same in folded condition, ready to be packed.

A bed embodying my invention lends itself exceptionally well to shipment by mail order. Thus, when removed from the shipping container or the pack for shipment, the bed will appear as in FIG. 3. To prepare it for use, the fabric portions are extended on the floor or other suitable flat surface, as in FIG. 2, and the metal frame is readily assembled to assume the position seen in FIG. 1.

It will be apparent that U-members S and S', both joined to angle members A, A, provide a rigid frame which adequately supports the upper fabric member 12b of the bed in its erected position, as seen in FIG. 1, which stability is enhanced by pressure which an animal may apply to the upper portion of member 12b. The frame parts may conveniently be formed of aluminum tubing of relatively small gauge such as ½inch to 1 inch in diameter, providing adequate rigidity with minimum weight, or rod stock may be used.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. An animal bed providing a plurality of body support positions for at least one animal to sleep or rest comprising in combination:
   a. an elongated base portion;
   b. a flexible sheet-like member secured adjacent one end of said base portion and extending in substantially contiguous relation over a portion of said base portion and then upwardly substantially vertically medially of the base portion to provide a free end; and c. a frame member comprising a pair of elongated elements secured to opposite sides of said base portion, upstanding elements continuous with the elongated elements, said upstanding elements being in a substantially vertical position and located medially of the base portion, and a cross piece continuous with and connecting said upstanding elements and supportingly attached to the free end of said flexible member which is freely draped; whereby a lower area of the freely draped flexible member and an area of the base portion remote from said lower area may each simultaneously serve directly to support an animal body and whereby an upper area of the freely draped flexible member may engage an animal's head.

2. An article as in claim 1, wherein said base portion comprises an envelope having a bottom sheet and a top sheet of flexible fabric and a resilient pad enclosed therein.

3. An article as in claim 2, wherein at least a portion of said flexible member is a continuation of said bottom sheet.

4. An article as in claim 1, wherein said bottom sheet, top sheet and flexible member are a continuous fabric.